INVENTOR.
DAVID C. KALBFELL
BY Hugh L. Millis Jr.

Jan. 30, 1962 D. C. KALBFELL 3,019,385

MAGNETIC MARKING SYSTEM

Filed June 2, 1958 3 Sheets-Sheet 2

INVENTOR.
DAVID C. KALBFELL
BY Hugh S. Wilkins Jr.

Jan. 30, 1962 D. C. KALBFELL 3,019,385
MAGNETIC MARKING SYSTEM
Filed June 2, 1958
3 Sheets-Sheet 3

INVENTOR.
DAVID C. KALBFELL
BY Hugh T. Millis Jr.

United States Patent Office 3,019,385

Patented Jan. 30, 1962

3,019,385

MAGNETIC MARKING SYSTEM

David C. Kalbfell, 941 Rosecrans St., San Diego, Calif.

Filed June 2, 1958, Ser. No. 739,110
9 Claims. (Cl. 324—34)

The present invention relates to a magnetic marking system and, more particularly, to a system for the magnetic recording and sensing of information on a moving sheet of magnetizable material.

Many practical requirements exist for marking sheet steel during the time it undergoes various handling operations following its manufacture. Some of these requirements relate to the measure of its length, to identify areas or positions where defects occur, or to print binary or pulse type of identifying information concerning its particular composition, cost, destination, etc. Of the types of marking possible, one based on magnetic or magnetizing principles would be generally preferred since the result is invisible, does not alter the composition of the steel nor mar the surface of the steel. This preference assumes that the marks would be sufficiently permanent, and that resolution and accuracy requirements could be met.

Previous attempts to magnetize spots on sheet steel have not succeeded in these respects, primarily since the approach has been to treat the steel as if it were a piece of magnetic tape, of the type employed in conventional tape recorders. In this approach, an electro-magnet recording transducer, having an air gap, was pulsed to produce a magnetic spot of small area whose lines of flux were shaped in the form of a small bar magnet, that is, they were straight and parallel to each other. The generally poor memory characteristics of ordinary sheet steel, the normal demagnetizing effects inherent in bar-shaped magnetized areas, and the normal shocks and vibrations incurred during the various handling operations caused recorded marks of this type to be very readily erased.

Although a more detailed discussion concerning demagnetizing effects will be presented later, it may be stated that this difficulty, present in previous techniques, is completely eliminated in the present invention by recording a closed flux pattern, of ring or toroidal shape, to represent an information carrying spot. In such toroidal patterns demagnetizing forces are completely absent owing to the closed path nature of the flux lines and lack of external poles. Hence, sheet steel, although having initially poor memory characteristics, can be magnetized to the ultimate possible degree and permanent patterns established by eliminating demagnetizing effects.

Toroidal flux patterns are recorded on the moving sheet steel, according to the present invention, in a novel manner. A pair of conductive wheels are spring biased into contact, one directly above the other, with the two surfaces of the sheet steel. An associated circuit, upon being actuated, produces a current pulse which passes between the wheels, through the steel. The current pulse produces a magnetic flux pattern, circularly directed around its path, through the steel. Accordingly, upon cessation of current flow, a toroidally shaped magnetic flux pattern will remain permanently in the steel around the spot through which the current flowed.

This recorded ring pattern is sensed or read in accordance with the present invention by a reading yoke assembly adapted to pass over the center portion of the toroid and sense the magnetic remanence, or degree of magnetization, of the toroid edges. This reading yoke assembly consists of a pair of wheels, made of magnetic material, and magnetically coupled to each other by a thin strip of saturable magnetic material having a low coercivity. The wheel and strip, in conjunction with the sheet steel, form a closed magnetic path. When a magnetized toroidal ring edge is encountered, the magneto-motive force of this edge acts to change the degree of magnetic saturation of the saturable strip. Now, an external circuit is employed in conjunction with the wheel assembly and the two function together as a magnetic amplifier circuit in which the "input signal" actually comprises the magneto-motive force of the magnetized edge instead of the normally employed input D.C. current flow through a corresponding input winding. Accordingly, changes in the degree of magnetization of the saturable strip will cause corresponding output signals to be produced by the circuit.

In practice, a pair of identical reading assemblies are employed and their circuits are connected to form a balanced magnetic amplifier. Now, by positioning the two read wheel assemblies such that one will pass over the toroidally magnetized spots and the other will always traverse unmagnetized portions of the sheet steel, random appearing magnetic fields set up in the steel by stray currents, the earth's magnetic field, etc., will be cancelled or bucked out in the circuit's output reading. On the other hand, an output signal will be produced whenever the first reading assembly passes over a toroidally magnetized area since there will be no cancelling effects under this condition.

A system of measuring lengths of the moving sheet steel is also presented in accordance with the present invention. In this technique, the recording station is followed by a reading station along the surface of the steel at a distance equivalent to the basic unit of distance desired for the marked lengths. Each output signal produced by the reading assembly is passed back to the record station and another spot recorded. By counting the recorded marks produced, a measure of total length of the sheet steel passing the read station is obtained. Since the equipment is capable of being accurately calibrated, precise, repeatable lengths may be measured.

It is, accordingly, the principal object of the present invention to provide apparatus for the recording and sensing of toroidally shaped areas on the surface of a moving sheet of magnetizable material.

Another object of the present invention is to provide apparatus for recording relatively permanent magnetic marks on the surface of a magnetizable material having a low remanence value.

Still another object of the present invention is the provision of apparatus for recording small, generally ring-shaped areas, not subject to demagnetizing forces on the surface of moving magnetizable material for marking purposes.

A further object of the present invention is to provide a magnetic reading apparatus for detecting toroidal shaped magnetized areas on the surface of sheet steel.

A still further object of the present invention is to provide a magnetic reading apparatus for detecting the leading and trailing edges of a generally ring-shaped, permanently magnetized flux pattern on the surface of a piece of magnetizable material.

Another object of the present invention is to provide magnetic reading and recording apparatus for respectively marking and sensing toroidally shaped flux patterns on the surface of a moving piece of magnetizable material.

Still another object of the present invention is to provide apparatus for recording a series of toroidally shaped areas at a series of points spaced at predetermined distances along the surface of moving sheet steel.

A still further object of the present invention is to provide a system for magnetically marking predetermined lengths along the surface of a moving sheet steel having a low remanence value.

Other objects and features of the present invention will become apparent to those skilled in the art as the disclosure is set forth in which the following detailed description is given of a preferred embodiment of the invention as illustrated in the accompanying drawings in which.

Figures 1, 2, 5:
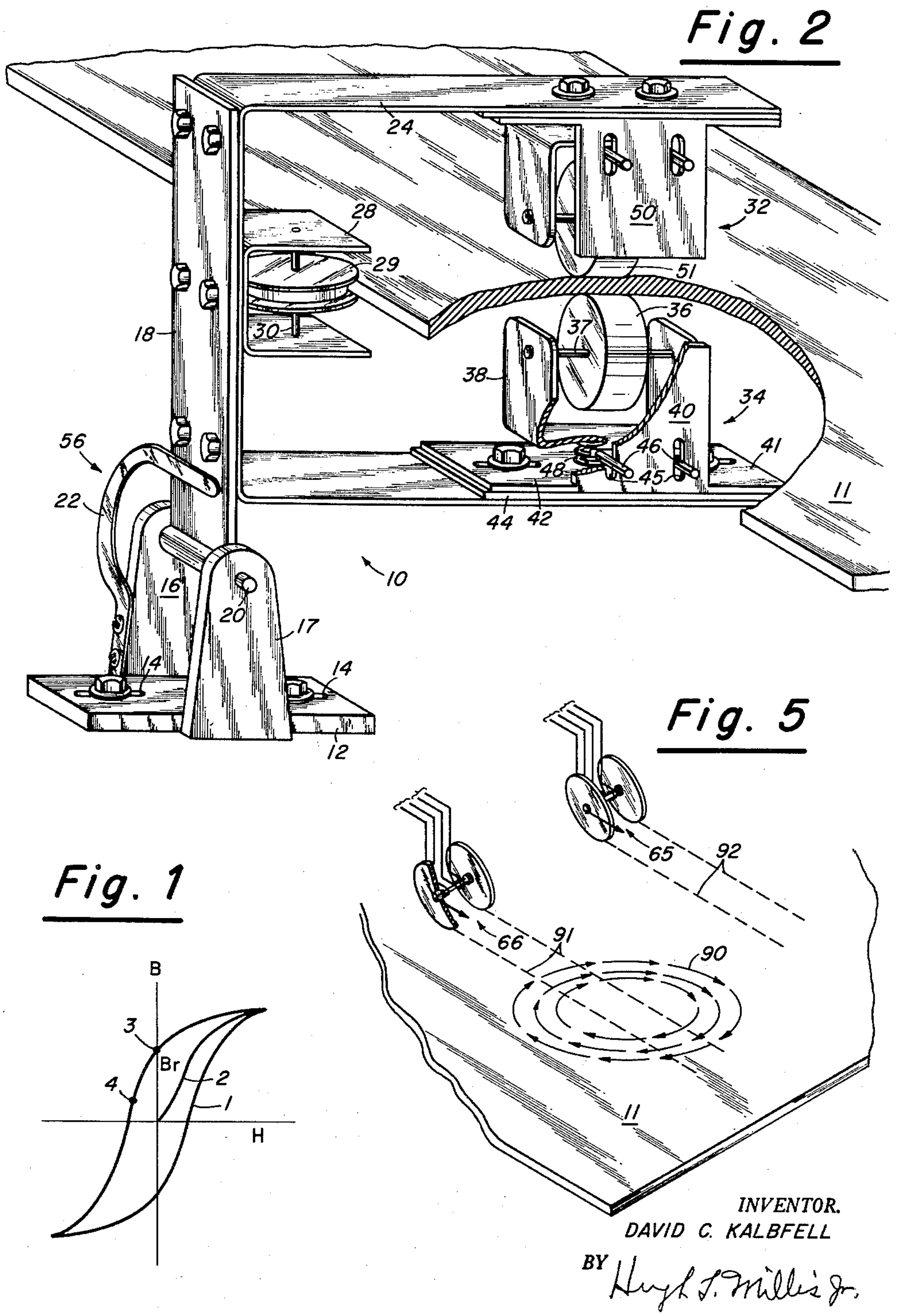
FIGURE 1 shows a B—H loop of a typical sheet steel material for use with the marking system according to the present invention.
FIGURE 2 is a perspective view, with parts broken away, of a recording mechanism in accordance with the present invention.
Figures 3, 4:
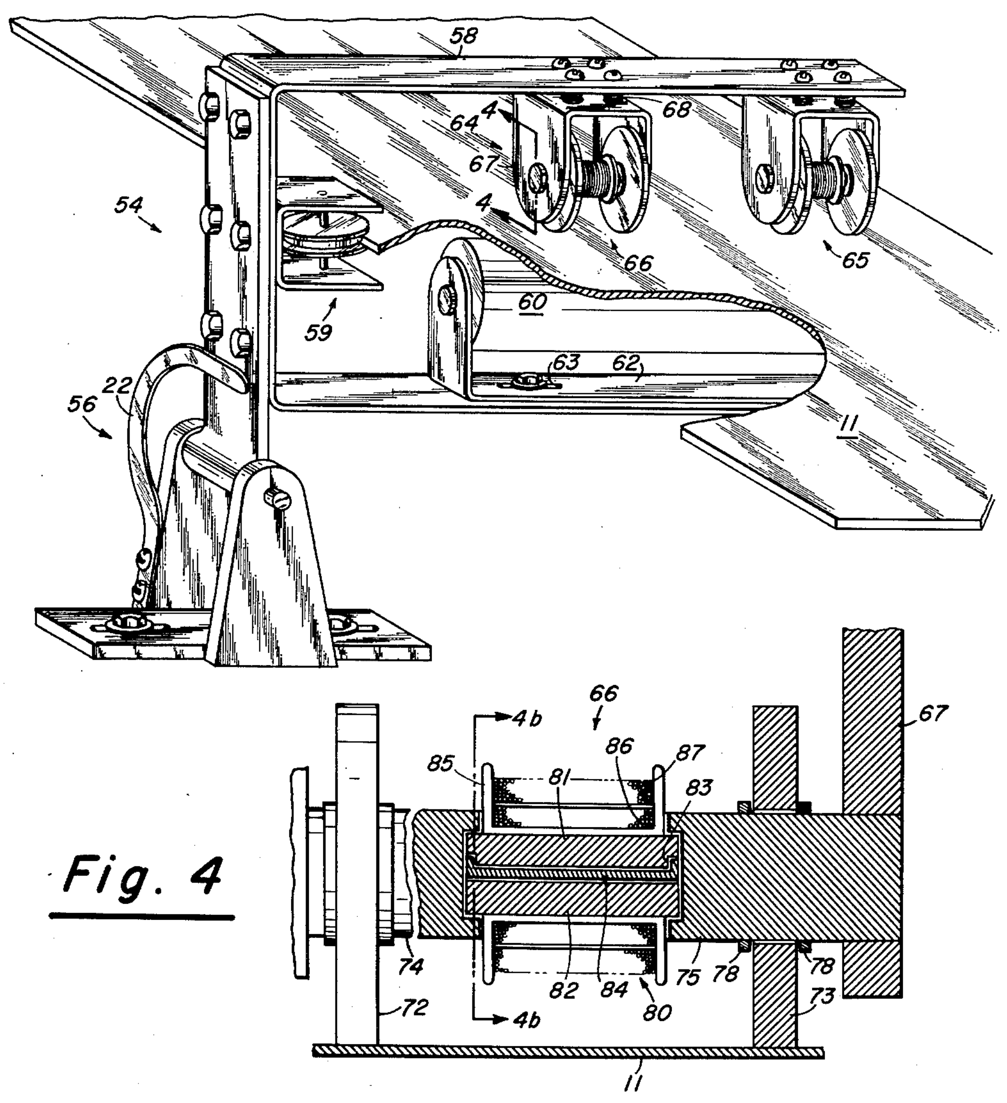
FIGURE 3 is a perspective view, with some parts broken away, of a reading mechanism according to the present invention.
FIGURE 4 is a view, mainly in cross-section, of a reading yoke assembly of the reading mechanism according to the present invention.
Figure 4B:
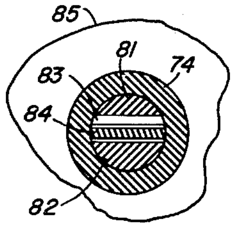
Figure 6:
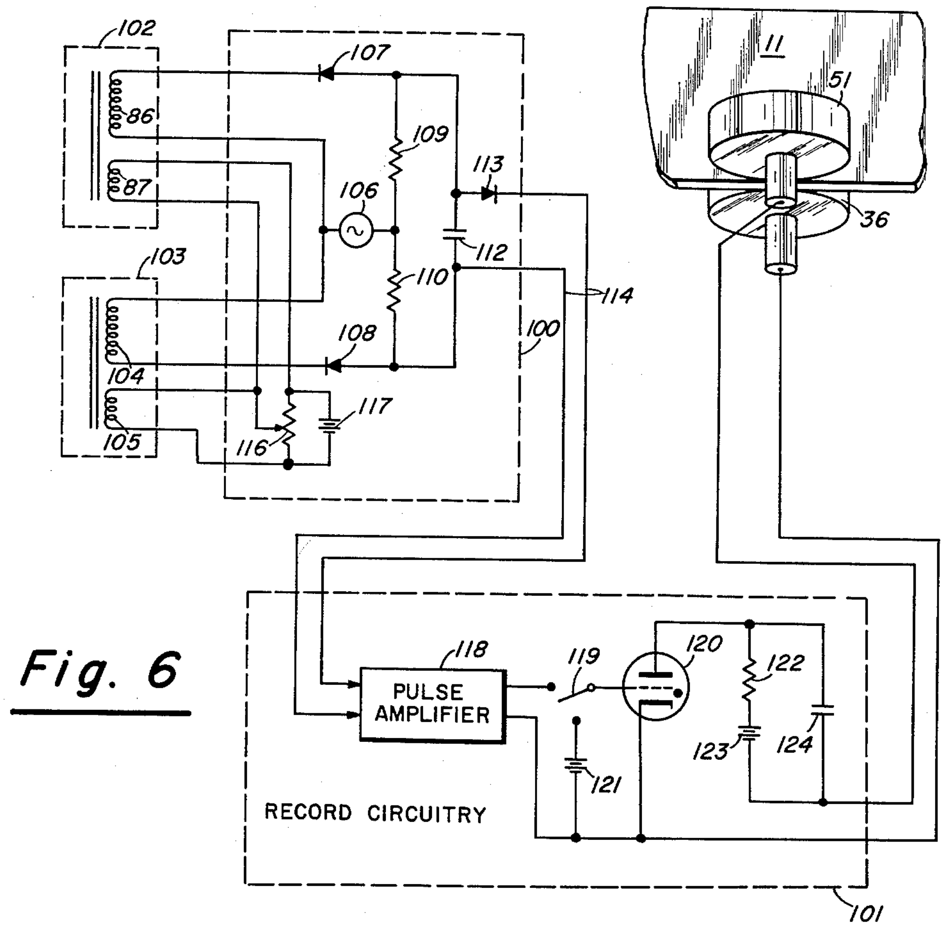
Figure 7:
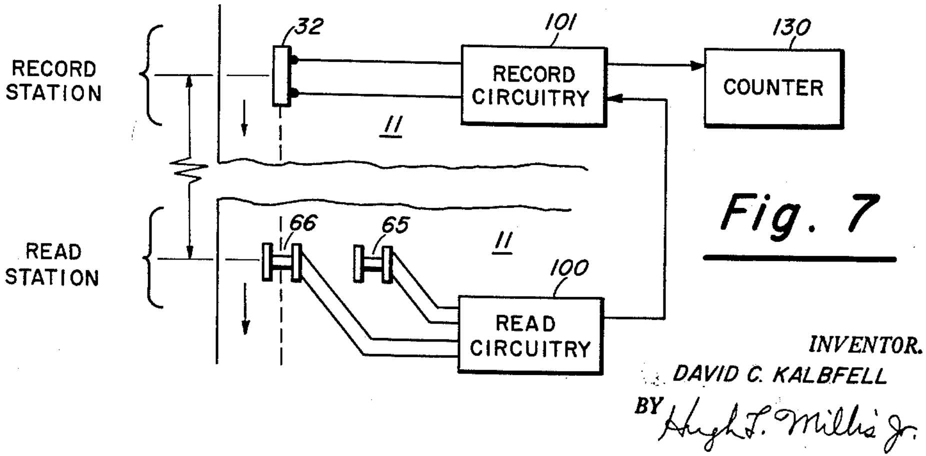

FIGURE 4*b* is a cross-sectional view taken along lines 4*b*—4*b* of FIGURE 4*a* showing the saturable strip of the reading yoke assembly in accordance with the present invention;

FIGURE 5 shows, in schematic fashion, the relative dimensional relationships existing, according to the present invention, between the recorded flux pattern and a pair of reading yoke assemblies;

FIGURE 6 is a circuit diagram, partly in block diagrammatic form, of a reading and record circuit in accordance with the present invention; and FIGURE 7 is a schematic view showing a length measuring system in accordance with the present invention.

Referring now to the drawings, there is shown in FIGURE 1, a B—H loop 1 characterizing a typical soft steel of the type intended to be marked according to the present invention. In the figure, H represents the magnetizing force applied to the iron and B is the resulting magnetic flux density set up in the iron. Completely demagnetized iron has zero values for both B and H. When a magnetizing field is first applied, the relationship between B and H is represented by an "initial magnetization curve" indicated at 2. Upon removal of this magnetizing field, curve 2 is not retraced, but instead, the iron flux decreases along the upper branch of the hysteresis loop to a point 3, designated $B_r$ and known as the remanence point.

If the area or region undergoing magnetization is physically of a rectangular shape, i.e., similar to a bar magnet, this quiescent or remanent point, for a zero external field, will not remain at point 3 but, instead, will move backward along the loop to some point 4, shown by way of example. This results from a negative internal magnetizing force caused by the poles at the ends of the bar, setting up a field of opposite direction to the magnet's field. This, in turn, produces a realignment of some of the dipoles and a resultant decrease of the overall effective field. This demagnetizing effect is explained in more detain on pages 8, 9, and 10 of the book Ferromagnetism, by R. M. Bozorth, published March 1951, by D. Von Nostrand Co. Inc, New York, New York The magnitude of this de-magnetizing force, resulting in the displacement of point 3 to point 4, will depend upon the ratio of length to width of the magnetized region. Point 4 will be close to point 1 for a long thin magnet and close to the H-axis for a short fat magnet. Furthermore, mechanical vibrations induced in such a magnet will cause point 4 to move closer to the H-axis since the demagnetizing force realigns dipoles more effectively under vibration conditions.

As mentioned previously, earlier attempts to mark soft steel magnetically relied on magnetizing small linear regions on the surface of the steel to form small bar magnets, as with magnetic recording tape. The magnetic material employed for tape recording, however, has a rectangular hysteresis loop and very large coercivity, hence making it possible to retain sufficient magnetization for recording purposes. On the other hand, soft iron is quite unsuitable for this type of recording application, because of its poor or at hysteresis loop, low remanence, and this demagnetizing effect.

In accordance with the present invention, a toroidal or ring shaped area is magnetized on the sheet steel for marking purposes in a manner to be later explanied. The demagnetizing forces present in a closed path are drastically minimized over those present in a bar-shaped magnet since the closed flux lines form no external poles and have no external flux lines or air gap. Hence, one of the major causes of failure in past attempts to mark soft steel magnetically will have been eliminated.

Referring now to FIGURE 2, there is illustrated a magnetic recording mechanism, generally indicated at 10, according to the present invention. Recording mechanism 10 is mounted adjacent a moving sheet of magnetizable material, such as rolled sheet steel 11, broken away in part for the purpose of clarity. This recording mechanism includes a base mounting block 12 of rectangular shape having a pair of slots or guides, as at 14, and a pair of extending arms 16 and 17 fixed midway along the two opposite edges of block 12.

A mounting plate 18 is pivotally mounted at its lower end to a shaft 20 whose ends are secured through appropriate openings in the respective upper portions of arms 16 and 17. One end of a leaf spring 22 is mounted, as by screws, to the rear edge of arm 16 and is properly curved in a lateral direction such that its other end makes a sliding, spring-loaded contact with plate 18. A wheel assembly mounting bracket 24, of U-shaped configuration, is mounted, as by screws, to mounting plate 18. An edge guide wheel bracket 28, also of U-shaped construction is attached to approximately the center inside portion of bracket 24, midway along mounting plate 18. An edge guide wheel 29 is attached to a shaft 30, the ends of which, in turn, are bearing mounted to the respective opposite legs of bracket 28. Wheel 29 includes a flat center portion and two extending flanges for maintaining positive engagement with the moving edge of sheet 11. Upper and lower recording wheel assemblies 32 and 34, respectively, are attached on the inside surfaces of the two extending legs of wheel assembly mounting bracket 24 opposite to, and facing, one another.

Consider now, a detailed description of assembly 34 which is shown partially broken away in order to reveal various aspects of its configuration. A lower recording wheel 36, formed of a conductive material such as copper or a hardened copper alloy, is attached midway along a shaft 37. The ends of shaft 37 are suitably supported, through bearings, in the opposite legs or flanges of a U-shaped wheel bracket 38. Bracket 38, in turn, is maintained in position by a wheel bracket support 40 which includes a pair of extending legs 41 and 42 and front and rear flanges. Each of extending legs 41 and 42 has a longitudinal slot through which the support is adjustably mounted by nut and bolt arrangements to the lower leg of bracket 24 through a rectangular block 44 of material having electrical insulating properties. Block 44 may be formed, for example, of any well known suitable material, such as Bakelite. The slots, nut and bolt arrangements and block 44 are so related that assembly 34 will be electrically isolated from bracket 24, and hence from electrical ground.

Wheel bracket support 40 includes, in addition, a pair of slots 45 in its front flange and a similar pair, not seen in the drawing, in its rear flange. The pairs of slots in the front and rear flanges are directly opposite one another. Extending through the two pairs of opposed slots in the front and rear flanges are a pair of pins 46, attached as by welding, soldering, etc., to the under surface of wheel bracket 38. A compression coil spring 48 is inserted between the underside of bracket 38 and wheel bracket support 40. The upper recording wheel assembly 32 is similar to assembly 34 except that its wheel bracket support 50, corresponding to support 40, does not include extending legs, similar to legs 41 and 42, with the corresponding slots, and hence lacks the lateral adjusting property. Its conductive wheel is designated 51.

Consider now in more detail the mechanical operation of the FIGURE 2 mechanism and various mechanical adjustments thereof as they pertain to the present invention. As will be brought forth in more detail later, the recording technique employed in the present invention is to pass unidirectional electric current between recording wheels 36 and 51 through magnetizable sheet 11 and induce a toroidal or generally circular magnetization pattern around the path of current flow. To do this, wheels 51 and 36 are positioned directly one above the other and maintained in spring loaded contact with sheet 11. Spring 48 in wheel assembly 34 and a corresponding spring in assembly 32 provides the needed tension for establishing this firm conductive contact. This spring loaded arrangement also permits normal transverse undulations of sheet 11 to occur as may be caused by bends, distortions, etc., in its structure, without breaking the required conductive contact.

An adjustment is provided in assembly 34 through the pair of slots and associated mounting nuts and bolts in legs 41 and 42 to set the point of contact of the two recording wheels with sheet 11 directly over and under one another. Through this arrangement, right and left adjustment of assembly 34 is possible, including a slight rotational and in-and-out adjustment. Since this adjustment will suffice for alignment purposes, assembly 32 is rigidly mounted to mounting support 24.

The block 44 of insulating material positioned between assembly 34 and support 24, and the corresponding block between assembly 32 and support 24, enable an electrical isolation to be maintained between them. This is necessary, as will be understood later, since sheet 11 and the frame of mechanism 10 are at ground potential and a direct current pulse flow should pass through the magnetizable sheet.

The purpose of edge guide wheel 29 is to maintain the point of contact of conductive wheels 36 and 51 at a constant distance from the edge of sheet 11 in order that the reading mechanism, to be described later, will scan precise areas in the recorded pattern. Spring tension, provided by spring 22, against mounting plate 18, acts to maintain firm contact with the edge of sheet 11 and hence maintain a constant recording distance from the edge to recording wheels 36 and 51. Slots 14 and associated nut and bolt arrangement are provided in order that the mounting plate 18, through base 12, can be maintained approximately vertical relative to sheet 11 in order that the edges of wheels 36 and 51 be maintained in flat engagement with sheet 11. If this adjustment was not provided, under certain conditions plate 18 might be tilted at an angle away from vertical and the edges of wheels 51 and 36 would suffer wear and cause misalignments in the resulting magnetization patterns.

In FIGURE 3 is shown a magnetic reading mechanism, generally indicated at 54, according to the present invention. This mechanism includes an adjustable base mounting block with extending arms and a spring-biased pivoted mounting plate, all designated 65 and identical to the correspondingly named portions of the FIGURE 2 writing mechanism. Also included is an edge guide mechanism mounted approximately in the center of the base portion of a mounting plate 58, similar to mounting plate 24 of the FIGURE 2 mechanism. A roller 60, preferably formed of a flexible non-magnetic material, such as rubber, is mounted on a roller support 62, the entire assembly, in turn, being mounted on the lower arm of mounting plate 58. This rubber roller assembly is adjustable in the manner shown and described previously for the lower record assembly 34 in FIGURE 2 through a pair of slots and cooperating nut and bolt arrangements, one being indicated at 63.

A pair of identical reading assemblies 64 and 65 are mounted on the upper arm of mounting plate 58. Assembly 64 includes a dual read wheel yoke arrangement, designated 66, which is shown in detail in FIGURES 4*a* and 4*b* and described in connection therewith. This reading wheel arrangement is mounted to a U-shaped support bracket 67 constructed of a non-magnetic material, such as brass. The upper surface of bracket 67 is mounted through four nut and bolt arrangements, as at 68, to mounting plate 58. A spring encloses each bolt between brackets 67 and 58 and the four springs act together to maintain the entire reading wheel assembly 64 in spring tension against sheet 11. Reading assembly 65, as stated previously, is identical in all respects to assembly 64 just described.

The mechanical arrangement of the reading mechanism is similar to the writing mechanism as described previously. The edge guide mechanism and the base spring arrangement maintain a constant distance between the two reading assemblies and the edge of sheet 11. Roller 60 is adjusted so that its line of contact on sheet 11 lies directly underneath the points of contact of the corresponding reading wheels. Also, the springs within the reading wheel arrangements act to maintain positive contact for flux reading purposes between the reading wheels and sheet 11 regardless of surface irregularities of the magnetizable sheet.

FIGURES 4 and 4*b* present, together, a detailed view of the dual read wheel yoke assembly 66 of FIGURE 3. Assembly 66 includes a pair of read wheels 72 and 73 adapted for making magnetic engagement with sheet 11. Wheels 72 and 73 are preferably formed of a low reluctance material such as soft steel, and are mounted on respective shafts 74 and 75, also preferably formed of a low reluctance material, such as soft steel. Each wheel is maintained in place on its associated shaft by a pair of press fitted rings, for example, indicated at 78 for shaft 75. Bearing surfaces are formed between the wheels and their associated shafts, and may be lubricated, for example, by a thin film of oil. Accordingly, the wheels only of the yoke assembly rotate, the remaining portion of the assembly being fixedly mounted.

Shafts 74 and 75 are identical and their outside ends are secured in opposite legs of bracket 67. Each includes a recessed portion on its inside face which is suitably dimensioned for receiving the saturable strip assembly, shown in longitudinal cross section in FIGURE 4*a* and generally indicated at 80.

Assembly 80 includes a pair of half cylindrical pieces 81 and 82 both formed of a non-magnetic material, such as stainless steel. Upper half cylindrical element 81 includes recesses or cavities 83 cut out along its two opposite ends adjacent its flat bottom portion. Inserted between pieces 81 and 82 is a flat strip of magnetic material of high permeability, such as Permalloy. This saturable strip assembly 80 is inserted between shafts 74 and 75 such that the ends of pieces 81 and 82 when combined to form a cylinder, fit snugly within the recessed portions of the shafts' ends. A bobbin 85 encloses the outer cylindrical surface formed by pieces 81 and 82. A signal output winding 86 is wound adjacent the inner bobbin surface and a bias winding 87 is wound to overlie winding 86.

FIGURE 4*b* is a cross-sectional view taken from FIGURE 4*a* to reveal more details of the saturable strip assembly 80. As seen, strip 84 extends crosswise between the mating half cylindrical pieces 81 and 82. Slot 83 is shown and, from FIGURE 4*a*, is preferably not deeper than the thickness of the strips 84 material in order that a magnetic contact be established between the upturned ends of strip 84 and the ends of the two shafts 74 and 75.

This saturable strip assembly may be fabricated very readily by taking a cylindrical piece of stainless steel of a diameter corresponding to the end recesses in shafts 74 and 75; and separating it, as by sawing, lengthwise to provide for the tape 84 placement. The ends of piece 81 are then enlarged by cutting the two cavities 83. Then, a strip of high permeability tape material such as moly-Permalloy, which may be as thin as 0.00012 inch and slightly longer than pieces 81 and 82, is inserted in place between the cylinders and its two ends bent up to lie in cavities 83. The entire assembly is then annealed in order to restore the magnetic properties of strip 84, assumed destroyed in the prior handling operation.

It will be observed that the yoke assembly of FIGURE 4 will complete a closed magnetic path comprising sheet material 11, wheels 72 and 74, shafts 74 and 75, and finally strip 84. No other magnetic path exists, since bracket 67, as specified, is formed of non-magnetic material and pieces 81 and 82 are likewise formed of non-magnetic material.

Having described in detail the recording and reading mechanisms and the reading yoke, reference is now made to FIGURE 5 which illustrates the relationship established between the scanning action of a read wheel assembly and the recorded toroidal flux pattern. In particular, a typical magnetization pattern 90 is shown, as made by the recording mechanism of FIGURE 2 and the record circuitry of FIGURE 6. Briefly, the record circuitry when actuated, produces a short electrical pulse of a relatively high current value. This pulse is passed through magnetizable sheet 11 between wheels 36 and 51. Since the record wheels engage sheet 11 in a line contact, transverse to its direction of travel, the sheet 11 velocity coupled with the finite pulse duration applied across the rollers, will produce an area along the sheet through which current flow will have taken place. This current flow will set up a strong magnetic flux field whose lines encircle, at any instant, the current path through the sheet 11 material. The flux, in turn, will produce a corresponding permanently magnetized area in the sheet corresponding to its pattern.

If the sheet velocity and pulse duration are so related such that an area of approximately square dimensions is swept by the current pulse, then the permanent magnetic pattern so induced in the sheet will be toroidal in shape. This is the pattern 90 shown in FIGURE 5. If, on the other hand, a rectangular area is swept by the current, a magnetized eliptical ring type of pattern will be formed still, however, having its flux lines directed in a closed path. The leading and trailing edges of such a pattern, produced primarily by the respective leading and trailing edges of the magnetizing current pulse, will still have its lines of flux primarily directed at right angles to the direction of sheet 11 travel. The importance of this aspect of the recording technique will become more evident later.

In accordance with the present invention, one of the reading assemblies 66, will travel across a specified portion of this toroidally shaped magnetic area and the read circuit, shown in FIGURE 6, will produce an output pulse indicating this traverse. In particular, the spacing between the read wheels will be less than the diameter of the recorded toroid and assembly 66 will be dimensionally held from the edge of sheet 11 such that its read wheels will sweep across the center of the toroidal area. In FIGURE 5, the contact paths made by the read wheels are indicated by the dotted lines, 91. In maintaining this spacing relationship, the magnetic flux pattern presented to yoke 66 will consist of the leading and trailing edges of the toroidal pattern and each edge, as will be seen in the drawing, will comprise flux lines directed traversely to the direction of read assembly travel and hence, in parallel to its saturable strip assembly. Thus, whenever a toroidal edge is encountered, the magnetic flux in the sheet steel will be partially by-passed or shunted through the wheels and the saturable strip. The ratio of flux division will depend upon the relative reluctances between the wheel contacts through the sheet steel and the reluctance up through the wheels and saturable strip. For achieving optimum read circuit results, the latter reluctance should be small.

It should be further noted that the directions of the flux lines in the leading and trailing edges are reversed from each other. That is, the leading edge flux lines, in the figure, will be directed in a general right to left direction viewed from the assembly, while the trailing edge will comprise flux directed in a general left to right direction from the same viewing position.

Read assembly 65 will be positioned relative to the edge of sheet 11 so as to avoid completely any portion of the toroidally magnetized areas. Its lines of wheel contact are indicated by dotted lines 92. However, the path of contact of this second read assembly is sufficiently close to the path of contact of the assembly 66, that they will simultaneously intercept uniformly magnetized areas of reasonable extent on the sheet 11 surface as may be caused by stray ground currents, nearby current carrying wires, the earth's magnetic field, etc. As brought out in the read circuitry description of FIGURE 6, the simultaneous interception by both read wheel assemblies of these random, uniform magnetic fields, enable their effects to be cancelled out by the circuitry and hence eliminated as sources of spurious output signals.

In FIGURE 6 is illustrated a typical read and record circuit according to the present invention. The read circuit, as will be described later, is given, by way of example only, as only one form of a magnetic amplifier while the record circuit, whose details are also given only by way of example, is essentially a pulse amplifier.

The read wheel yoke assemblies 64 and 65 are represented circuitwise by winding assembly blocks 102 and 103, respectively. Hence, signal winding 86 and bias winding 87 of assembly 64 are shown again in block 102 while block 103 contains similar signal and bias windings 104 and 105, respectively. One end of read winding 86 of assembly 64 is connected with one end of winding 104 to one output terminal of a source 106, of A.-C. signals. The other ends of windings 86 and 104 are connected through a pair of diodes 107 and 108, respectively, and a pair of resistors 109 and 110, respectively, to the other output terminal of source 106. The common junction of diode 107 and resistor 109 is connected to one plate of a capacitor 112, the other plate of capacitor 112 being connected to the common junction of diode 108 and resistor 110. The output signal of read circuit 100 is taken across condenser 112, through a diode to appear on output conductors 114.

The output terminals of a bias potential source, such as battery 117, are respectively connected to one end of each of bias windings 87 and 105. The other ends of bias windings 87 and 105 are mutually connected to the moveable arm of a potentiometer 116, in turn, connected across battery 117.

Output conductors 114 of circuit 100 are connected to a conventional pulse amplifier 118, shown in block schematic form, in the record circuit 101. One output terminal of pulse amplifier 118 is connected to one fixed contact point of a single pole, single throw switch 119. The moveable arm of switch 119 is connected to the grid terminal of a current switching device, such as thyratron 120 while the other contact point of switch 119 is connected to the positive terminal of a source of potential, such as battery 121, the negative terminal of which is connected to the other output terminal of amplifier 118 and to the cathode of thyratron 120. The plate of the thyratron is connected through a resistor 122 to the positive terminal of another source of potential, such as battery 123. The negative terminal of battery 123 is connected to record wheel 51 while the cathode of a thyratron 120 is connected to the other record wheel 36. An energy storage device, such as capacitor 124, is connected between the plate of thyratron 120 and the negative terminal of battery 123.

In considering now the operation of the read and record circuitry, consider first the specific operation of wheel assembly windings 102 and its related portion of read circuit 100. First of all, as stated earlier, the reading yoke acts as a magnetic shunt to sheet 11 and the magnetomotive force of any magnetized areas on sheet 11 will hence be shunted by the yoke and passed through its saturable strip.

Now, the yoke and circuit arrangement act together as a conventional magnetic amplifier except with one major difference. In this arrangement, there is no input winding and hence no D.-C. signal input acting, in conventional magnetic amplifier fashion, to control the magnitude of an output A.-C. signal by varying the operating point on the B—H curve of the saturable portion in its transformer arrangement. Instead, the shunted magnetomotive force from a magnetized area on sheet 11 will act, similarly to the D.-C. input signal in conventional magnetic amplifier applications, to control the magnetic point of operation of the saturable strip in the reading yoke assembly. Thus an equivalence in the operation is effected although with different circuit configurations.

In exact particular, the frequecy of A.-C. source is sufficiently high that its output signal will make a number of excursions during the interval a toroidal edge is passed over by the read wheel assembly. This signal is continuously rectified by diode 107 so that a half wave rectified signal form is applied across winding 86. The current through bias winding 87 is initially adjusted by potentiometer 116 to maintain the magnetic operating point of the saturable strip at a value such that the peaks of this rectified signal from source 106 barely saturate the saturable strip in the absence of traversing a toroidally magnetized area on sheet 11. Under this condition, the impedance of coil 86 will be such that only minor current flow will take place and a small output signal will appear across resistor 109.

Upon passing a random magnetized area of a normally low magnetomotive force caused, as stated before, by ground currents, the earth's magnetic field, etc., this magnetic operation point of the saturable strip will be changed slightly by the yoke shunting action. In particular, the change will be in one of two directions; toward greater saturation or less saturation as determined by the flux direction of the particular magnetized area passed. These changes of operating point will result in the output current, and hence output voltage appearing at the common junction of condenser 112 and resistor 109, being respectively increased or decreased.

Now, winding assembly 103 and its associated circuitry is arranged in a similar fashion so that these random fields will also act to simultaneously increase or decrease the output voltage appearing at the common junction of resistor 110 and condenser 112. Accordingly, the read circuit output signal, taken across capacitor 112, will not change since the potentials applied to its two plates will change identical amounts in the same direction. Hence, this type of balanced magnetic amplifier read circuit arrangement is sensitive to random appearing magnetic fields in the sheet steel.

On the other hand, whenever the leading and trailing edges of a toroidally magnetized pattern are encountered, winding assembly 102 and its associated circuitry will produce a pair of corresponding signals of a relatively large magnitude at its corresponding plate of condenser 112. These two signals will be of opposite polarity due to the oppositely directed flux lines in the two toroid edges, as shown in FIGURE 5. Also, no similar, equal signals will be applied to the other plate of condenser 112 since only winding assembly 102 will be affected by the toroid pattern. Hence, these toroidally induced signals will form the only output signals appearing across condenser 112.

The winding sense of coil 86 relative to the flux direction of the toroid edges as produced by the record current direction flow through the steel is preferably made such that the leading toroid edge will cause a positive signal to be produced at the condenser plate. This signal, in turn, will be passed by diode 113, owing to its direction of connection, to the record circuitry 101. The corresponding negative signal in turn produced by the toroid trailing edge will accordingly be blocked by diode 113.

Consider now, the operation of record circuitry 101. In particular, assume that the moveable switch arm of switch 119 is thrown to its left contact postion to couple the output signals produced by pulse amplifier 118 to the grid of thyratron 120 and further assume that the circuitry is between record intervals. During this time, capacitor 124 will be charged to the potential of battery 123 through resistor 122. Pulse amplifier 118 will then amplify the next positive pulse appearing on conductors 114 from the read circuit, and this amplified positive pulse will be applied to the grid of thyratron 120. Thyratron 120 will thereupon trigger with its cathode-to-plate resistance going to a very low value and the charge, previously accumulated on capacitor 124, being transmitted therethrough to pass between record wheel 51, sheet 11, and record wheel 36. This will result in another toroidally shaped magnetized area being formed on sheet 11, in the manner previously described. This operation will be repeated each instance the read assembly passes over the leading edge of a toroid pattern.

The value of capacitor 124 may be initially selected relative to the conducting resistance of thyratron 120, the contact resistance between the record wheels and sheet 11, and the velocity of sheet 11 travel, such that a substantially square shaped area will be swept out along the steel surface by the record wheels during the time of condenser 124 discharge. In any event, a closed flux path recorded pattern will be formed by the current discharge, as mentioned previously, since the magnetizing flux lines will encircle the current path at any instant and the final permanent magnetized pattern will generally surround the area swept by the record wheels during the discharge interval.

It will be, in general, more desirable to sense the leading edge of the resulting pattern since it will be more intense magnetically owing to the generally exponential decay shape of condenser-resistor discharge curves, and more predictable for reading purposes owing to the sharp triggering characteristics of thyratron tubes.

On FIGURE 7 is shown, in schematic form, record and read units according to the present invention for magnetically marking pre-determined lengths along a section of moving magnetizable material, such as sheet steel 11, assumed to move in a downward direction. The record unit, comprising the recording wheel assembly and circuitry, is placed first along the sheet, relative to its direction of travel, so that its marks or magnetized areas are intercepted by the read unit. Upon each passage of the leading edge of a magnetized toroidal area under the read wheel yoke, an output pulse is produced by the read circuitry as described in connection with FIGURE 6. By applying this pulse to the input of the record circuitry, a current pulse will be passed between the record wheels through sheet 11, with another magnetized area being produced on sheet 11. This described operation will be sequentially repeated with the result that a series of equally spaced magnetized toroidal areas will be formed on the sheet.

By initally calibrating or relating the distance between the record and write points with the length of sheet 11 thus marked, a predetermined and exactly repeatable distance between marks can be attained and by counting either record or reading pulses an extremerly accurate total length of magnetizable sheet which has passed under the two stations may be determined. For this purpose, a counter 130 is shown receiving the output pulses from the record circuitry. If the counter indicates the total number of pulses read during a single run of material, the length may be computed by multiplying that count by the calibrated distance existing between the read and record stations.

To initiate a sheet 11 measuring operation of this type, it is apparent that an initial magnetizing pulse must be placed on the sheet before the operation can begin. This initial recording requirement is provided for in the record circuit 101 shown in FIGURE 6 by the battery 121 and switch 119 arrangement. With sheet 11 positioned at a pre-determined start point, the moveable arm of switch 119 may be thrown to its low contact position with the result that the positive potential of battery 121 will trigger thyratron 120. This of course, will produce an initial magnetized mark on the sheet. Then, upon movement of the sheet, successive marks will be produced at intervals based on the calibrated distance between the record and write units.

It will be appreciated, of course, by those skilled in the art, that the foregoing disclosure relates only to a detailed preferred embodiment of the invention, and that numerous modifications or alterations may be made therein without departing from the spirit and scope of the invention as set forth in the appended claims.

What is claimed is:

1. In combination: conductive magnetizable means; first and second conductive means in conductive contact with said conductive magnetizable means whereby a conductive path is established through said magnetizable means between said first and second conductive means, said conductive magnetizable means comprising a closed magnetic path around said conductive path; and means for supplying a current pulse between said first and second conductive means and through said conductive path whereby a circular magnetic field is set up in said closed magnetic path.

2. A device for producing a toroidally magnetized area in a moving sheet of magnetizable material having upper and lower surfaces, said device comprising: first and second electrodes in moving conductive contact with the upper and lower surfaces, respectively, of said moving sheet; actuable means coupled between said first and second electrodes and responsive when actuated for producing a current pulse and passing said pulse in a conductive path between said first and second electrodes through said moving sheet, said sheet comprising a closed magnetic path around said conductive path; and means for actuating the last-named means whereby said current pulse produces a toroidally shaped magnetic flux pattern within said closed magnetic path in said moving sheet.

3. A device for producing a toroidally magnetized area on a moving sheet of magnetizable conductive material having upper and lower surfaces, said device comprising: a first electrode in a first conductive contact with the upper surface of said moving sheet; a second electrode in a second conductive contact with the lower surface of said moving sheet, said first and second conductive contacts being substantially over and under each other, respectively; actuable electrical energy means having first and second output conductors and responsive when actuated for producing a pulse of electrical potential across said first and second output conductors; means conductively coupling the first and second output conductors of said electrical energy means to said first and second electrodes respectively; and means for actuating said electrical energy means whereby a pulse of electrical current is conducted in a path through said sheet of magnetizable material, said sheet comprising a closed magnetic path in a small area around the current path whereby a toroidally shaped flux pattern is set up in said magnetic path within said area.

4. A device for producing a magnetized area of general circular shape at a predetermined distance from the edge of a moving sheet of magnetizable conductive material having upper and lower surfaces, said device comprising: a recording assembly including first and second conductive wheels in rolling conductive contact with the upper and lower surfaces, respectively, of said moving sheet, said rolling contacts being directly opposite one another through such surface, spring means for maintaining such first and second conductive wheels in spring biased engagement with said first upper and lower surfaces, respectively, and means for maintaining such first and second rolling contacts at said pre-determined distance from the edge of said magnetizable conductive material; actuable electrical energy means conductively coupled to the first and second conductive wheels of said recording assembly and responsive when actuated for producing an electrical current pulse which passes in a conductive path between said wheels through said sheet of magnetizable material, said sheet comprising a closed magnetic path around said conductive path; and means for actuating said actuable electrical energy means whereby the current pulse between said wheels and through said material induces a circular magnetic field in said closed magnetic path and thereby produces a magnetized area of a generally circular shape around the path of current pulse flow.

5. The device according to claim 4 wherein said actuable electrical energy means includes a current source, triggering means, and means for serially connecting said current source and said triggering means between said first and second conductive wheels whereby the actuation of said actuable electrical means triggers said triggering means to conductively couple said current source effectively between said first and second conductive wheels.

6. Apparatus for magnetically marking predetermined lengths along a moving sheet of magnetizable material, said apparatus comprising: recording means responsive to an applied electrical signal for producing a generally circularly shaped closed magnetic pattern on said moving sheet of magnetizable material; reading means positioned at substantially said predetermined distance from said recording means and responsive to a passing circularly shaped magnetization pattern on said moving sheet of magnetizable material for producing an electrical signal; and means for applying the electrical signals produced by said reading means to said recording means whereby said sheet of magnetizable material is magnetically marked at said predetermined lengths.

7. A device for magnetically marking a moving sheet of steel having upper and lower surfaces at a series of spaced points, said device comprising: first and second electrode means in contact with the upper and lower surfaces, respectively, of said moving sheet of steel; actuable means coupled between said first and second electrode means and responsive when actuated for producing a current pulse between said first and second electrode means through said moving sheet whereby a closed-flux pattern is recorded thereby in said sheet; magnetic yoke means in contact with said sheet of steel to form a magnetic shunt path therewith and positioned to intercept the closed-flux patterns recorded by said current pulses; and electrical circuit means conductively coupled to said magnetic yoke means and responsive so each interception of said closed-flux patterns by said yoke means for actuating said actuable means.

8. The method of applying permanent magnetic marks on a moving sheet of magnetizable and electrically conductive material which comprises passing current through said sheet normal to the surfaces thereof, and limiting the duration of flow of said current in relation to the speed of movement of the sheet such that the current flow sweeps over a small area of said sheet surfaces, said current flow setting up a strong magnetic flux field in said sheet, said flux field having lines which at any instant encircle the current path through the sheet, and said flux permanently magnetizing said sheet within said area.

9. The method of recording and sensing magnetic marks on the surface of a moving sheet of magnetizable and electrically conductive material comprising passing a pulse of current through the sheet, said pulse having a duration related to the speed of movement of said sheet, said current pulse inducing a toroidal shaped magnetic flux pattern in the surface of said sheet, said flux pattern producing a closed magnetized ring-shaped area in said sheet and constituting a mark on the sheet, and sensing said mark by shunting a portion of said ring shaped area into the magnetic circuit of a magnetic amplifier whereby the magnetomotive force of said ring portion constitutes the input to said magnetic amplifier.

References Cited in the file of this patent

UNITED STATES PATENTS

| | | |
|---|---|---|
| 2,136,375 | De Forest | Nov. 15, 1938 |
| 2,270,732 | Jones | Jan. 20, 1942 |
| 2,485,285 | Harris | Oct. 18, 1949 |
| 2,703,384 | Rendel | Mar. 1, 1955 |
| 2,794,951 | Broding et al. | June 4, 1957 |